No. 846,728. PATENTED MAR. 12, 1907.
R. B. COCHRANE & W. A. WARMAN.
SHAPING MACHINE.
APPLICATION FILED MAY 22, 1901.

5 SHEETS—SHEET 1.

WITNESSES:
INVENTORS
BY
ATTORNEY.

No. 846,728.

PATENTED MAR. 12, 1907.

R. B. COCHRANE & W. A. WARMAN.
SHAPING MACHINE.
APPLICATION FILED MAY 22, 1901.

5 SHEETS—SHEET 2.

No. 846,728. PATENTED MAR. 12, 1907.
R. B. COCHRANE & W. A. WARMAN.
SHAPING MACHINE.
APPLICATION FILED MAY 22, 1901.

5 SHEETS—SHEET 3.

Witnesses. Inventors

No. 846,728. PATENTED MAR. 12, 1907.
R. B. COCHRANE & W. A. WARMAN.
SHAPING MACHINE.
APPLICATION FILED MAY 22, 1901.
5 SHEETS—SHEET 4.
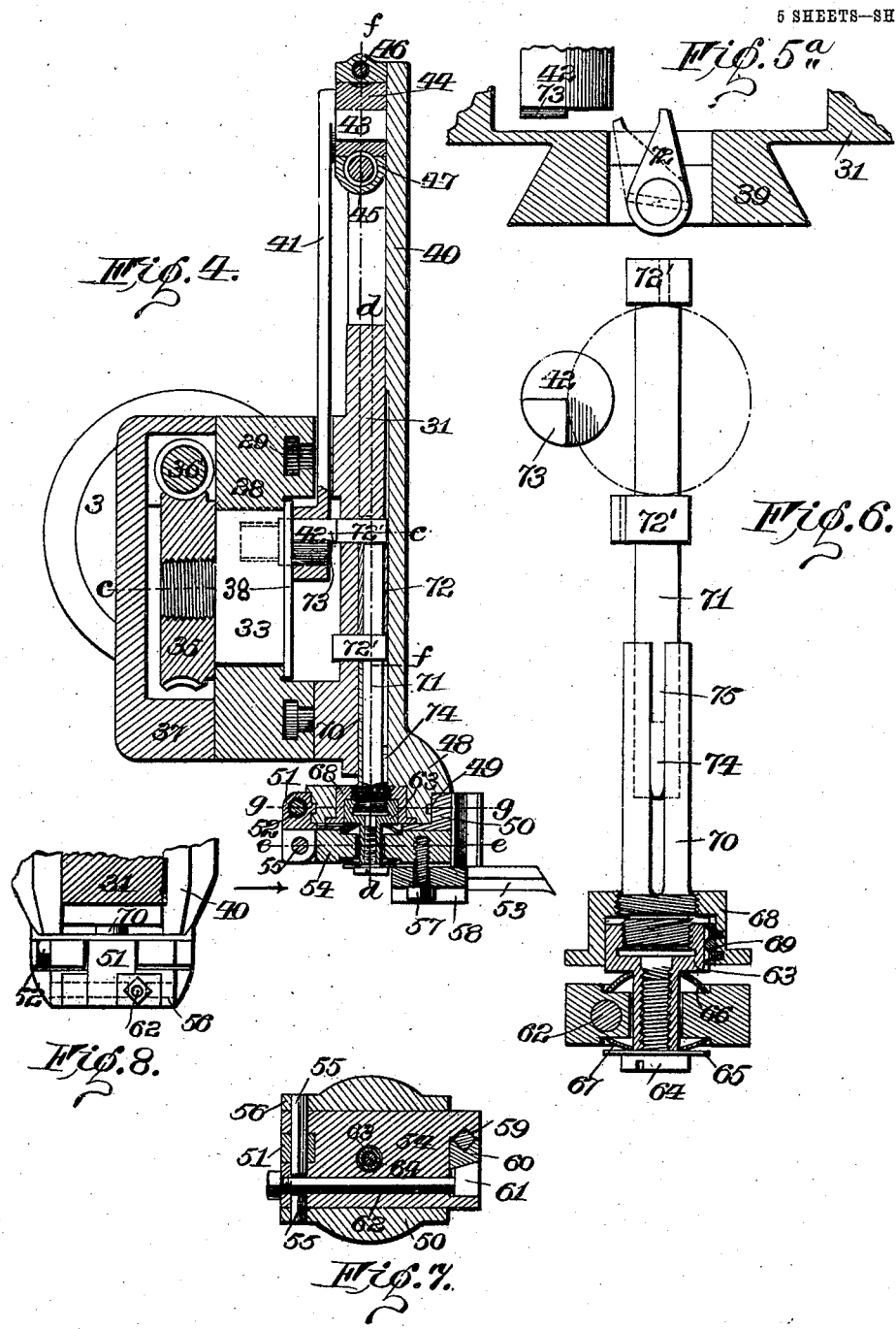

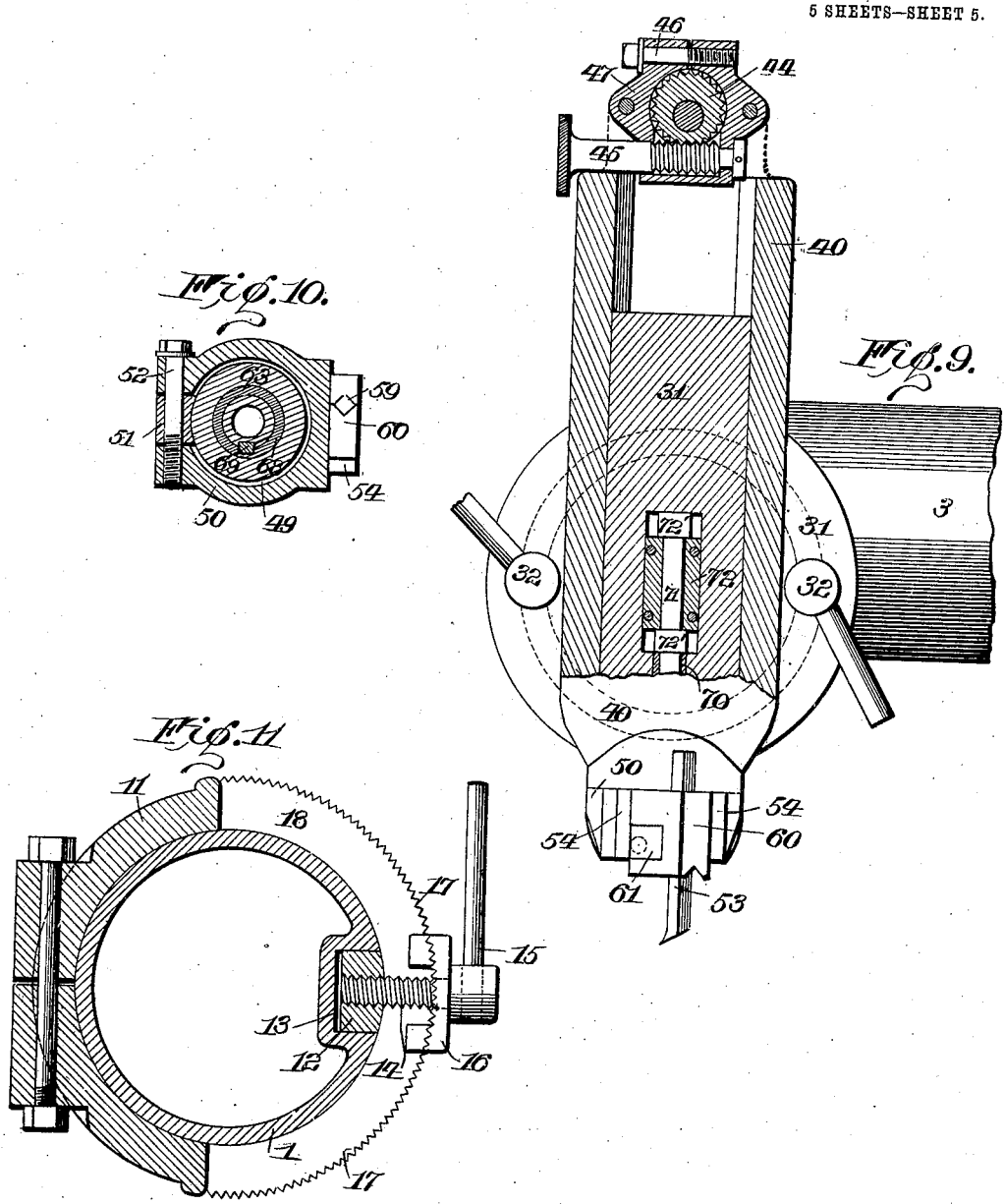

UNITED STATES PATENT OFFICE.

ROBERT B. COCHRANE AND WILLIAM A. WARMAN, OF ROCHESTER, NEW YORK, ASSIGNORS, BY DIRECT AND MESNE ASSIGNMENTS, TO COCHRANE BLY COMPANY, OF ROCHESTER, NEW YORK, A CORPORATION OF NEW YORK.

SHAPING-MACHINE.

No. 846,728. Specification of Letters Patent. Patented March 12, 1907.

Application filed May 22, 1901. Serial No. 61,403.

*To all whom it may concern:*

Be it known that we, ROBERT B. COCHRANE and WILLIAM A. WARMAN, of Rochester, in the county of Monroe and State of New York, have invented certain new and useful Improvements in Shaping-Machines; and we do hereby declare the following to be a full, clear, and exact description of the same, reference being had to the accompanying drawings, forming a part of this specification, and to the numerals marked thereon.

Our present invention has for its object to provide a shaping-machine embodying a reciprocating tool particularly adapted for operating upon metal and the formation of punching or forming dies, but capable of other uses, and consists generally in a machine capable of manipulation and operation in such manner that it may be placed in any desired relation to the work so as to operate to the best advantage, the tool-operating parts and work-support being in the preferred form capable of a universal relative adjustment.

The invention further consists in certain improvements hereinafter described, the novel features being pointed out particularly in the claims at the end of this specification.

Figure 1:
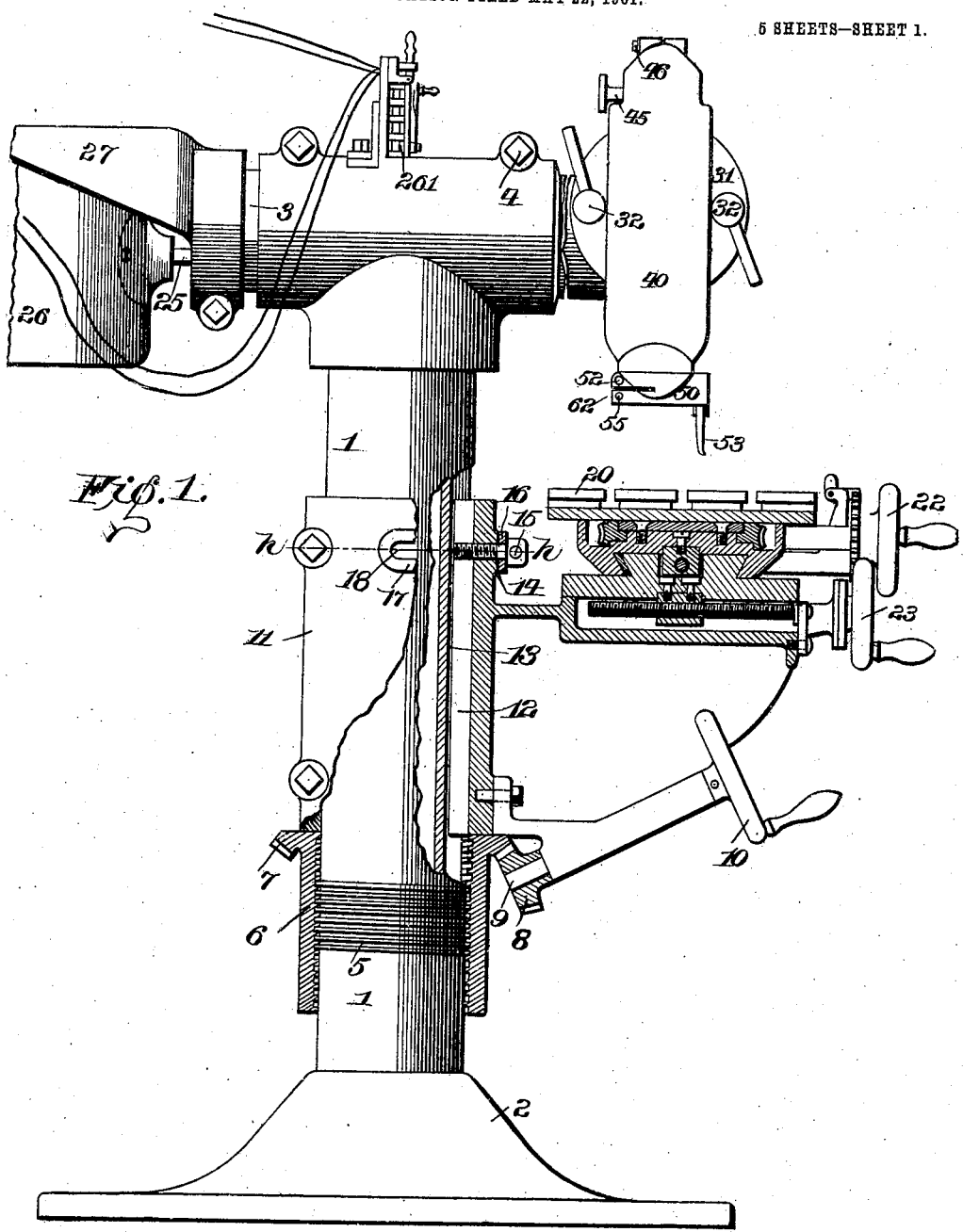
Figure 2:
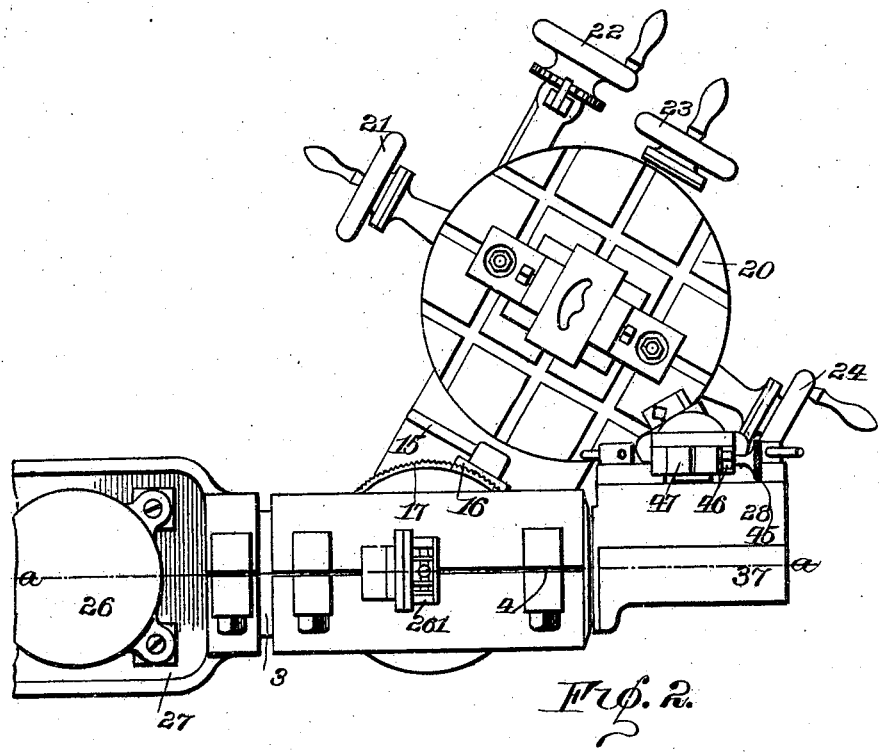
Figure 3:
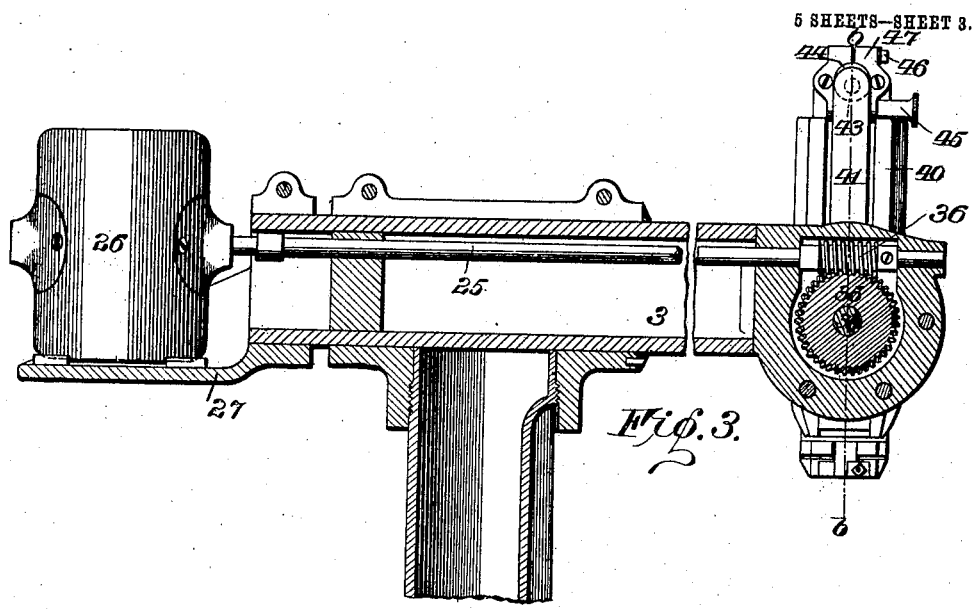
Figure 5:
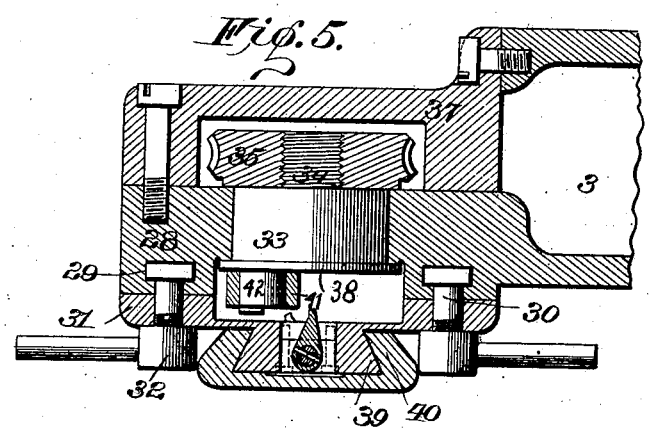

In the drawings, Figure 1 is a side elevation of a machine constructed in accordance with our invention, the work-support being shown in section; Fig. 2, a plan view of the machine with the work-support and operating-tool in a different position from that shown in Fig. 1. Fig. 3 is a longitudinal vertical section on the line *a a* of Fig. 2; Fig. 4, a vertical sectional view on the line *b b* of Fig. 3; Fig. 5, a horizontal sectional view on the line *c c* of Fig. 4; Fig. 5ª, an enlarged sectional view showing some of the parts contained in Fig. 5; Fig. 6, an enlarged sectional view on the line *d d* of Fig. 4 looking to the left; Fig. 7, a horizontal sectional view on the line *e e* of Fig. 4; Fig. 8, a side elevation of the tool-holding device looking in the direction of the arrow at the bottom of Fig. 4 with a portion of the frame of the machine in section; Fig. 9, a vertical sectional view on the line *f f* of Fig. 4; Fig. 10, a sectional view on the line *g g* of Fig. 4; Fig. 11, a horizontal sectional view on the line *h h* of Fig. 1.

Similar reference-numerals in the several figures indicate similar parts.

The main frame of our machine embodies a standard or column 1, mounted on or attached to a suitable base 2, and at the upper end having a horizontally-extending cylindrical recessed support for receiving the arm or frame 3, carrying the operating parts of the machine. This cylindrical support forms a sleeve which is split longitudinally, preferably at its upper side, the two sides being secured by bolts 4 to cause it to grasp and firmly hold the cylindrical frame 3, but permitting the rotary and also the longitudinal adjustment of the latter, as will be explained.

The lower portion of the column or standard 1 is provided with peripheral screw-threads 5, with which engages the threaded interior of a rotary nut or sleeve 6, said nut having at its upper portion beveled gear-teeth 7, with which meshes a pinion 8, secured to a shaft 9, journaled in the work-supporting frame and operated by means of a hand-wheel 10. The work-supporting frame 11 rests upon the nut or sleeve 6 and encircles the column, being prevented from rotation thereon by a key or spline 12, operating in a slot 13, formed in the column, and adjustably secured to the sleeve or frame 11 by a screw 14, having an operating-handle 15 and passing through a lock-plate 16, having serrations on its inner side and adapted to engage corresponding serrations 17 on the opposite sides of a semicircular slot 18, formed in the upper portion of the sleeve or frame 11. The relation of the sleeve or frame 11, and the spline or key 12 may be varied within the limits of the length of the slot 18 by loosening the screw 14 and moving outward the clamp-plate 16, which will permit the turning of the work-supporting frame around the column and free of the spline or key; but by tightening the screw 14 said frame will be clamped to the key and only a vertical movement permitted, caused by the rotation of the nut or sleeve 6.

The work-support proper mounted upon the frame 11 may be of any suitable description; but we prefer to provide a slotted top-plate or work-support 20, to which the work to be operated upon is clamped in the usual manner, said plate being capable of adjustment in the usual or any preferred manner by means of the hand-wheels 21, 22, 23, and 24 to provide lateral, longitudinal, and rotary adjustments relative to the frame 11, these adjusting devices being of the usual or any well-known construction.

In a shaping-machine adapted to operate upon dies, &c., it is eminently desirable not only that the work-support be adjustable, but also that the operating-tool be capable practically of a universal movement, so as to operate upon any desired portion of work held in any desired position, and to this end the cylindrical frame 3 is made to carry all of the operating parts and is revolubly, as well as longitudinally, movable on the column or standard. In the present embodiment we extend through this tubular frame or arm 3 an operating-shaft 25, to one end of which is connected a means for rotating it, in the present instance an electric motor indicated by 26 and secured to a bracket or frame 27, bolted upon the outer end of the frame 3, or in lieu of this motor belt pulleys or gears could be employed, if desired, although we prefer for purposes of mobility such a motor as shown, which may be regulated by a switch or controller 261 or otherwise. The forward end of the frame or arm 3 is provided with a face-plate 28, having its outer face portion, which extends in the general plane of the arm, provided with an annular or undercut groove or recess 29, the undercut portion of said groove receiving the heads of T-bolts 30, passing through apertures in a head 31 and engaged on the outer ends by hand-nuts 32, so as to clamp said face-plate firmly upon the head 28 and also permit the rotary adjustment thereof. The face-plate 28, which is in the present construction a continuation and of one piece with the arm 3, is provided with a laterally-extending recess or bearing in which is journaled an arbor or shaft 33, preferably of large diameter, and having a threaded rearwardly-extending portion 34, upon which is secured an operating worm-wheel 35, said wheel being engaged by a worm 36, secured near the forward end of the shaft 25, the said end being in the present instance journaled in a cover-plate or housing 37, as shown in Figs. 3 and 5, from which construction it will be seen that the rotation of the main shaft 25 will impart a rotary motion to the short arbor or shaft 33. This arbor 33 is provided with a collar or flange 38 upon its forward side, which engages the face-plate 28, the rear side of said head being engaged by the worm-wheel 35, which secures the parts in position, although permitting the free rotation of the arbor.

The head or frame 31 is provided upon its outer side with the undercut longitudinally-extending bearing-surfaces 39, as shown in Figs. 5 and 5ª, to receive correspondingly-shaped flanges of a slide or tool-carrier 40, carrying at its lower end the tool for operating upon the work and connected by a pitman 41, pivoted at its upper end to a crank-pin 42 on the outer face of the arbor 33, as shown in Figs. 4 and 5.

The connection between the pitman and the slide 40 is made adjustable by providing the pitman 41 with a pin 43 at its upper end, operating in a worm-wheel or sleeve 44, journaled in the upper end of the slide and having an aperture or pin-hole arranged eccentrically thereof. Meshing with the worm-wheel is a worm-shaft 45, by means of which the sleeve may be rotarily adjusted and when adjusted may be secured rigidly by a clamp-screw 46, engaging the split upper end of the bracket 47, bolted to the upper end of the slide 40. The lower end of the slide or carrier 40 is provided with the cylindrical extension 48, having the annular groove 49 therein, to which is clamped a head 50, split at one side and encircling said annular extension and secured from longitudinal movement thereon by a key-piece 51, entering the annular groove 49, and held in position by a bolt 52, which also serves to clamp the head upon the slide or carrier, as shown particularly in Figs. 4 and 10. This construction permits the rotary adjustment of the head 50 around the end of the extension on the slide and its adjustment longitudinally as well, so that by loosening the bolt 52 it may be rotarily adjusted and by removing it and the key-piece the head may be taken off.

In a machine in which a relative reciprocating motion between the tool and work is provided it is desirable that during the outward movement of the tool after making the cut it should be permitted sufficient motion to clear itself from the work, and we therefore provide means for accomplishing this automatically and at the same time so arrange the operating means that in the event that the tool is not permitted to operate at once a yielding connection is provided to prevent breakage of the parts.

In the present embodiment the tool (indicated by 53) is secured to a holder or block 54, movable in a slot or recess in the head 50 and pivoted by a pin 55, passing through the lower perforated extension of the key-piece 51 and through ears 56 on the lower portion of the head 50, as shown in Figs. 4, 7, and 8. If a tool having a horizontally-extending shank is used, as shown in Fig. 4, it is clamped to the under side of the holder 54 by means of a bolt 57 and a plate 58. In order, however, to provide for using a tool having a vertically-extending shank, as shown in Figs. 7 and 9, we provide the forward extension of the holder 54 with an angular jaw 59, between which and a plate 60 the shank of the tool is held, being clamped by an inclined block 61, operated upon by a bolt 62, as shown in Fig. 7, or in lieu of this construction any suitable tool-holder may be employed.

The holder 54 is provided with a central perforation, through which passes the downward extension of a nut 63, having secured to its lower end, by means of a screw 64, a washer or disk 65, and between the upper portion of the nut and the holder 54 is a spring ring or washer 66, a similar washer 67 being arranged between the disk 65 and said block, so that there is a yielding connection between the nut and the holder for a purpose to be described. The nut 63 is provided with screw-threads in its upper end and is capable of a movement vertically within a nut 68, secured rigidly in the lower end of the tool-carrier or slide 40 and held by the head 50, but is prevented from rotary movement by a spline or feather 69, operating in a vertically-exending slot in the nut 63, as shown in Fig. 6.

The upper portion of the nut 68 is provided with threads having an opposite lead from the threads in the nut 63, and an oscillatory screw or arbor 70 extends through and engages both said nuts 68 and 63, having two threaded portions of opposite lead adapted to fit said nuts and forming a right and left screw connection, the arrangement being such that when said screw or shaft is rotated in both of them the nut 63 will be given a greater vertical movement than that imparted to the screw 70. This screw connection could be otherwise formed, if desired; but we prefer to form both threads on the exterior of one member—viz., the screw—and therefore make the part 63 in the form of a nut. The upper portion of the screw 70 is hollow for the reception of an oscillatory arbor or shaft 71, journaled in a bearing-block 72 in the head 31 (see Fig. 9) and having upon its rear sides tappet-arms 72', projecting inwardly toward the crank-pin 42 and adapted to be operated upon by a projection 73, formed on the end of said crank-pin, Figs. 4 and 6. The screw or shaft 70 and the arbor 71 are connected by a telescoping connection, so as to cause their simultaneous rotation, but permitting their relative longitudinal movement, the connection embodying in the present instance a key-piece 74 on the arbor 71, operating in a slot 75 in the screw 70. The lug or projection 73 on the crank-pin 42 and the tappets 72' are so relatively arranged that when the crank is rotated it will engage first one and then the other of said tappets, turning the telescoping screw-shaft in a direction to cause the downward movement of the tool-holder or block to release the tool from the metal during the upward movement of the slide and drawing the tool-holder or block up against the under side of the head 54 to bring the tool into operative position and holding it during the downward movement of the slide, the differential screw connection with the holder 54 accomplishing this movement, which is of sufficient amplitude to enable the tool to clear the work when it rises. As the screw is arranged axially of the rotarily adjustable head 50, the same movement of the holder is accomplished irrespective of the position of the head. The spring connections 66 and 67 between the nut and tool-carrying block 54 are strong enough to cause the positive operation of the tool under ordinary circumstances; but they also serve to prevent breakage of the parts if the tool should be caught in any manner during its downward clearing movement, and the lower spring 67 prevents the breakage of the parts when, for instance, the lower end of the tool is bottomed in the work being operated upon and permits the tool to be forced away from the material by the operation of the spring during the upward movement of the slide. This tool-operating device is capable of use in connection with other machines than the one herein shown; but we find it to operate well in practice and have therefore illustrated it.

By arranging all of the operating parts of the machine upon an arm 3 in the frame, which is longitudinally adjustable upon the main frame and rotarily adjustable as well, and mounting the reciprocating tool-operating devices upon a head or plate which is itself rotarily adjustable in a plane substantially parallel with that of the main supporting tubular arm we are enabled to provide a universal adjustment which renders the machine capable of use for die-making or for finishing irregular-shaped castings in a manner in which the shapers or similar machines now in use are incapable of operating.

We claim as our invention—

1. In a shaper, the combination with a main frame and a horizontally-extending arm mounted thereon and rotatable about its longitudinal axis, means for clamping the arm in adjusted position, a reciprocatory tool-carrier mounted on the arm and adjustable in a plane extending parallel with said axis thereof, and an operating-shaft for the tool-carrier extending through the arm.

2. In a shaper, the combination with a main frame and an arm mounted for longitudinal adjustment thereon and rotatable about its longitudinal axis, of clamping devices for securing the arm in adjusted position, an operating-shaft extending through the arm, a guide mounted on the latter and adjustable at an angle to the axis of the arm in a plane extending parallel therewith, a reciprocating tool-carrier on the guide and connections between it and the shaft.

3. In a shaper, the combination with a main frame or support, of an arm or frame on the main frame and rotatable on its longitudinal axis, an operating-shaft extending through the arm, a guide-frame pivoted on the arm on an axis extending transversely of the latter, an arbor concentric with the pivotal center of the guide and connected to the shaft, a tool-carrier on the guide and connections between it and the arbor for causing the operation of the former.

4. In a shaper, the combination with a main frame or support, an arm rotarily adjustable on its longitudinal axis in the frame having an operating-shaft extending longitudinally thereof and an arbor extending transversely thereof and connected to the shaft, of a guide pivoted on the arm on an axis substantially concentric with that of the arbor, a reciprocatory tool-carrier on the guide and connections between it and the arbor.

5. In a shaper, the combination with a main frame or support, and a horizontally-extending arm thereon having an operating-shaft and an arbor extending transversely thereof and connected to the shaft, of a guide rotarily adjustable on the arm on an axis substantially concentric with that of the arbor, a reciprocating tool-carrier on the guide and connections between it and the arbor.

6. In a shaper, the combination with a main frame or support, and a horizontally-extending arm thereon rotarily adjustable on its longitudinal axis, an operating-shaft extending longitudinally of the arm and an arbor geared thereto and extending transversely of the shaft, of a guide rotarily adjustable on an axis substantially concentric with that of the arbor, a reciprocating tool-carrier on the guide and operating connections between it and the arbor.

7. In a shaper, the combination with a main frame or support and an arm or frame rotarily adjustable on its axis and having an operating-shaft therein and an arbor extending transversely thereof having a crank thereon, of a head adjustable on the arm or frame around the axis of the arbor, a tool-carrier on the head and a pitman connecting the crank and tool-carrier.

8. In a shaper, the combination with a main frame or support and an arm or frame supported on the main frame and rotarily adjustable on its axis, having an operating-shaft therein and a motor for operating the shaft supported on the arm, of an arbor extending in a plane transversely of the shaft, a head adjustable at an angle to the shaft around the axis of the arbor, a reciprocating tool-carrier on the head and connections between the arbor and tool-carrier for reciprocating the latter.

9. In a shaper, the combination with a main frame or support, an arm thereon and an operating-shaft therein, an arbor on the arm extending at an angle to the shaft and driven therefrom, of a head rotarily adjustable on the arm around the axis of the arbor, a reciprocatory tool-carrier on the head and connections between the arbor and carrier for actuating the latter.

10. In a shaper, the combination with the main frame or support having the horizontal bearing therein, the arm rotarily adjustable in the bearing, a motor at one end of the arm, an operating-shaft connected to the motor and extending through the arm, of a head mounted on the end of the arm opposite the motor and adjustable at an angle to the arm on an axis extending transversely of that of the arm, a reciprocating tool-carrier on the head and connections between it and the shaft for causing its operation.

11. In a shaper, the combination with the main frame or support, having the horizontal bearing therein, the arm rotarily adjustable in the bearing and an operating-shaft extending through the arm, of a head mounted on the end of the arm mounted upon an axis extending transversely of that of the arm and adjustable at an angle to the longitudinal axis thereof, a reciprocating tool-carrier on the head and driving connections between it and the shaft.

12. In a shaper, the combination with an arm or frame a shaft extending longitudinally thereof and an arbor extending at right angles to the shaft and driven therefrom having a crank, of a head adjustable around the axis of the arbor, a slide thereon and a pitman connecting the slide and crank to actuate the former.

13. In a shaper, the combination with a supporting-arm, having the transversely-extending bearing, an arbor journaled in the bearing having the flange at one end thereof, the wheel at the other end said flange and wheel preventing longitudinal movement in the bearing, and a reciprocating tool supported on the arm and actuated by the arbor, of an operating-shaft extending longitudinally of the arm and connections between the shaft and arbor.

14. In a shaper, the combination with a supporting-arm, having the transversely-extending bearing, the arbor therein having the crank, and the face-plate on the arm extending transversely of the bearing, of the head rotarily adjustable on said plate on an axis concentric with that of the arbor, means for securing the head in position, and a reciprocatory tool-carrier on the head and a pitman connecting it with the crank.

15. In a shaper, the combination with a supporting-arm having the transversely-extending bearing, the arbor therein having the crank, and the face-plate on the arm extending transversely of the arbor, of the head rotarily adjustable on said face-plate on an axis coincident with that of the arbor, means for securing the head in position, a reciprocating tool-carrier on the head, a pitman connecting the crank and tool-carrier and means for adjusting the pitman relatively to the crank and carrier.

16. In a shaper, the combination with a reciprocatory tool carrier or slide, of a tool carried thereby and movable relatively thereto to clear the work, a crank operating the carrier and connections between the crank and tool for positively moving the tool on the carrier during the movement of the carrier in one direction.

17. In a shaper, the combination with a reciprocatory tool carrier or slide, of a tool carried thereby and movable relatively to the work to clear it when retracted, and an oscillatory screw actuated in opposite directions for operating the tool laterally of its line of cutting when the carrier moves in one direction.

18. In a shaper, the combination with a reciprocating tool-carrier, of a tool carried thereby and movable relatively to the work to clear it when retracted, and an opposite screw connection for moving the tool laterally of the line of cutting when reciprocated in opposite directions.

19. In a shaper, the combination with a reciprocatory tool-carrier, of a tool carried thereby and movable relatively to the line of cutting to clear the work, means for actuating the tool to clear the work and yielding connections between said means and the tool.

20. In a shaper, the combination with a reciprocatory tool-carrier, of a tool carried thereby and movable relatively to the line of cutting to clear the work, means for actuating the tool to clear the work embodying a screw and yielding connections between the screw and tool.

21. In a shaper, the combination with a reciprocatory tool-carrier, of a tool carried thereby and movable relatively to the line of cutting to clear the work, a screw for operating said tool relatively to the work and means for oscillating said screw in opposite directions as the carrier is reciprocated.

22. In a shaper, the combination with a reciprocatory tool-carrier, of a tool carried thereby and movable laterally relatively to the line of cutting to clear the work, a screw for operating said tool relatively to the work having tappets thereon and a movable part coöperating with the tappets when the carrier is at the extremes of its movement.

23. In a shaper, the combination with a reciprocatory tool-carrier and a tool-holder pivoted thereon, of a rotary crank connected to the carrier, and means for moving the tool-holder on its pivot actuated by the crank.

24. In a shaper, the combination with a reciprocatory tool-carrier and a tool-holder pivoted thereon, of a rotary crank connected to the carrier and means for moving the tool-holder on its pivot embodying a screw and connections between the crank and screw for oscillating the latter from the former.

25. In a shaper, the combination with a support, a reciprocatory tool-carrier, a tool-holder movable on the carrier to cause the tool to clear the work and operating devices for moving the holder arranged on the support and having an extensible connection with the holder.

26. In a shaper, the combination with a support, and reciprocatory tool-carrier, of a tool-holder movable on the carrier to cause the tool to clear the work, means on the carrier for moving the holder, an oscillatory shaft on the support and an extensible connection between it and said means.

27. In a shaper, the combination with a support, and a reciprocatory tool-carrier, of a tool-holder movable on the carrier to cause the tool to clear the work, means on the carrier for moving the holder embodying a screw and nut, an oscillatory shaft on the support and an extensible connection between the shaft and screw.

28. In a shaper, the combination with a support, and a reciprocatory tool-carrier, of a tool-holder movable on the carrier to cause the tool to clear the work, means on the carrier for moving the holder embodying a screw and nut and yielding connections between them and the holder, an oscillatory shaft on the support and an extensible connection between the shaft and screw.

29. In a shaper, the combination with a reciprocatory tool-carrier, of a head rotarily adjustable thereon, the tool-holding holder movable on the head and means for moving the holder on the head extending axially of the center of adjustment of the latter whereby the holder may be moved on the head in all positions of rotary adjustment of the latter.

30. In a shaper, the combination with a reciprocatory tool-carrier, having the cylindrical extension thereon, of the head rotatably adjustable on the boss, the tool-holder movable on the head and means concentric with the extension for operating the holder on its pivot.

31. In a shaper, the combination with a reciprocatory tool-carrier, the tool-holder movable thereon, an oscillatory screw and a right and left threaded connection between the screw, carrier and holder.

32. In a shaper, the combination with a reciprocatory tool-carrier, the tool-holder pivoted thereon, the nut, the springs arranged between the nut and holder, the screw threaded in the carrier and in the nut by threads having opposite leads.

33. In a shaper, the combination with a reciprocatory tool-carrier, and the nut in the end thereof, of the tool-holder pivoted on the carrier, the nut, the springs between the holder and nut, the screw provided with threads having opposite leads engaging the nuts and means for oscillating the screw.

34. In a shaper, the combination with a support, the rotary arbor having the crank-pin, the reciprocatory tool-carrier and the pitman connected thereto and to the crank-pin, of the tool-holder pivoted on the carrier, the oscillatory arbor having the tappets engaged by the crank-pin and an extensible connection between the arbor and tool-holder embodying a screw connection for moving the holder as the carrier is reciprocated.

35. In a shaper, the combination with the standard or column having the keyway therein, of a vertically-movable work-supporting frame sleeved on the column and a spline or key adjustably connected to the frame to permit rotation of the latter independently of the key.

36. In a shaper, the combination with the standard or column having the keyway therein, and the reciprocatory tool-carrier thereon universally adjustable relatively to the standard, of a work-supporting frame sleeved on the standard and vertically and rotarily adjustable thereon, a key adjustably connected to the frame and operating in the keyway.

37. In a shaper, the combination with the standard or column having a keyway therein, of a work-supporting frame sleeved on the column and vertically adjustable thereon having the horizontal slot, a key arranged in the keyway of the column and a securing device extending through the slot connected to the key and adjustably connected to the frame.

38. The combination with the standard or column having a keyway therein, of a work-supporting frame sleeved on the standard and having the horizontal slot with serrated edges, a key-plate in the keyway the locking-plate coöperating with the serrated edges of the slot and the bolt connecting the locking plate and key.

ROBERT B. COCHRANE.
WILLIAM A. WARMAN.

Witnesses:
G. WILLARD RICH,
ELIZABETH J. PERRY.